C. CENTONI.
LOCKING MECHANISM.
APPLICATION FILED OCT. 28, 1918.

1,309,351.

Patented July 8, 1919.

WITNESS:
Leo J. DuBois.

INVENTOR:
Cesare Centoni
BY A. N. Gualano
ATTORNEY.

UNITED STATES PATENT OFFICE.

CESARE CENTONI, OF CHICAGO, ILLINOIS.

LOCKING MECHANISM.

1,309,351.  Specification of Letters Patent.  Patented July 8, 1919.

Application filed October 28, 1918.  Serial No. 260,021.

*To all whom it may concern:*

Be it known that I, CESARE CENTONI, a subject of the King of Italy, and a resident of Chicago, in the county of Cook and State of Illinois, have invented certain new and useful Improvements in Locking Mechanisms, of which the following is a specification.

This invention relates to that type of locking mechanisms for automobiles in which the locking bolt has engagement with the steering stem to prevent a turning movement of the same, and the present improvement has for its objects:—

To provide a structural formation and association of parts, wherein the release of the locking means for automatic engagement with the steering stem is readily and quickly effected, and the retraction or return of said locking means to an inactive condition can only be attained by a guarded means controlled by the lawful user. And further to provide an automatically operated alarm means in connection with said locking means and adapted on a turning movement of the steering stem to a locking position, to sound and maintain in operation an alarm horn or the like, all as will hereinafter more fully appear.

In the accompanying drawing:—

Like reference numerals indicate like parts in the several views.

Figure 1:
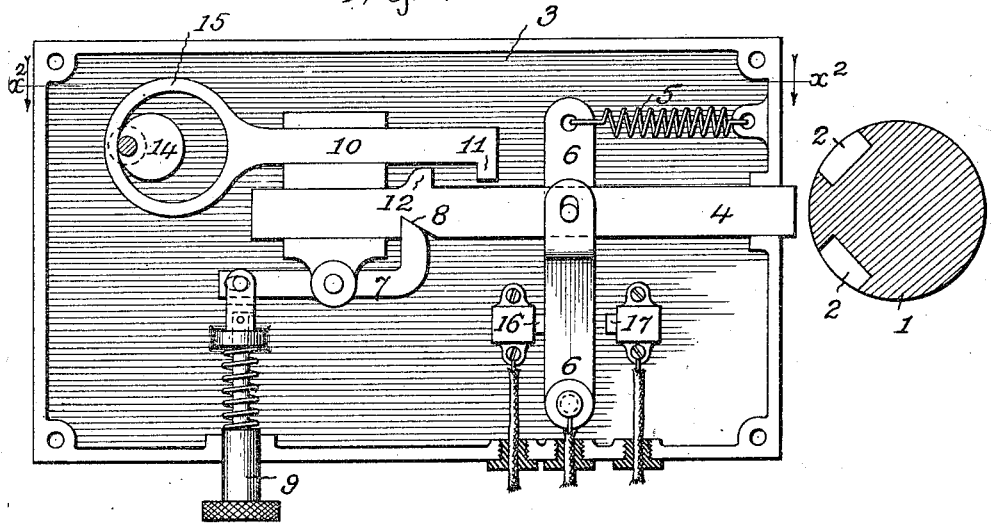
Figure 1, is an elevation of the present mechanism, one of the side sections of the inclosing casing being removed.
Figure 2:
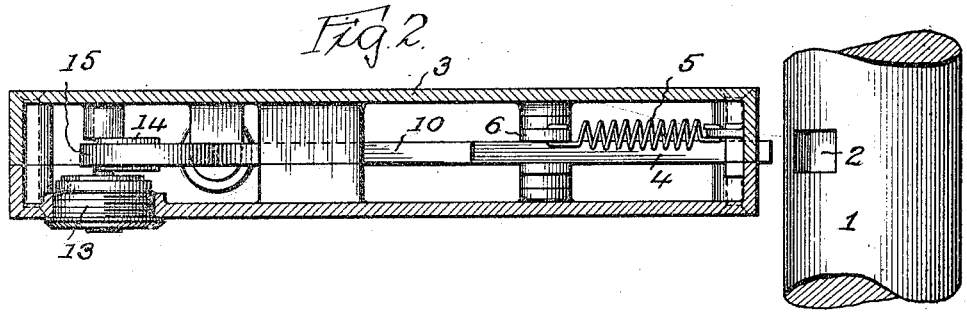
Fig. 2, is a horizontal section on line $x^2$—$x^2$, Fig. 1.

Referring to the drawing, 1 designates a portion of an automobile steering stem formed with a pair of peripheral notches 2 in spaced relation approximating the limit of the turning movements of said stem in actual use.

3 designates the inclosing casing, preferably of a closed rectangular box shape and formed in interengaging sections for convenient assemblage of the mechanism inclosed therein.

4 designates a bolt or bar movable in guides in the casing 3, with one end extending out through said casing for locking engagement with one or the other of the said notches 2, when the steering stem 1 is turned to bring a notch 2 in line with the bolt 4, aforesaid.

5 designates a spring connected to the bolt 4, preferably through an intermediate rock arm 6, and adapted to move said bolt in an outward direction.

7 designates a spring actuated locking dog, the detent of which is adapted to engage in a notch 8 in the bolt 4. The notch 8 is so positioned that when in engagement with the dog 7, the bolt 4 will be held in its retracted position against the stress of the spring 5 aforesaid.

9 designates an operating stem extending out through the casing 3 and operatively connected to the locking dog 7 for a manual actuation of the same in effecting a release of the bolt 4.

10 designates a sliding yoke frame having at one end a lateral lug 11 adapted to engage with a complementary lug 12 on the bolt 4 aforesaid. In the backward sliding movement of said yoke frame 10, the lugs 11 and 12 engage and the bolt 4 is drawn backward to a position to be engaged and held by the locking dog 7 aforesaid.

13 designates a key operated lock of any usual and suitable form, secured in a side wall of the casing 3 and provided with a revoluble eccentric hub 14 adapted for engagement in a central yoke 15 at one end of the yoke frame 10 aforesaid, and adapted in an operation of the lock 13 to effect the above described retracting movement of the yoke frame 10 and bolt 4.

In the preferred form of the present invention shown in the drawing, the intermediate rock arm 6, constitutes the movable member of an electric switch in the circuit of the electric alarm of the automobile, and to such end is connected to one pole of the battery or other sources of electro-motive force of said circuit.

Figure 3:
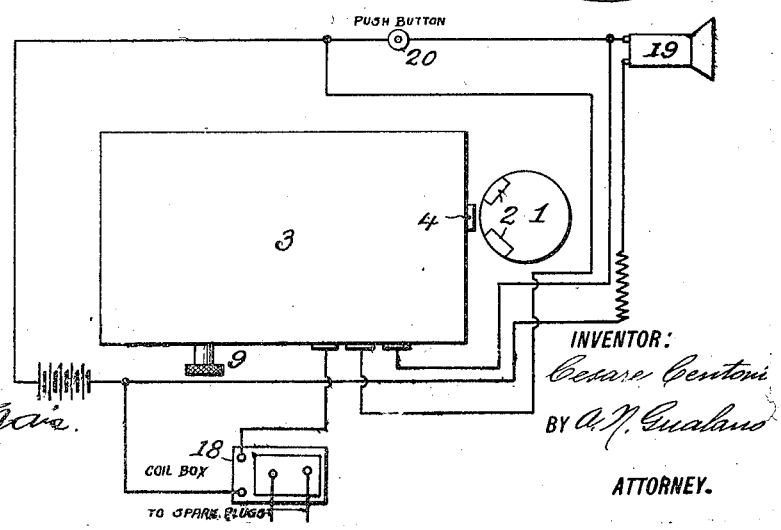
Fig. 3, is a diagram view of the locking mechanism, alarm mechanism and electrical connections.

16 and 17 designate stationary terminals or contacts arranged at opposite sides of the rock-arm 6 and adapted for alternate electrical contact with the same. The contact 16 is preferably connected through the primary circuit of the spark plug system 18 of the automobile with the source of electro-motive force, so that as the locking bolt 4 is released, the primary circuit of the spark plug system will be broken and the same rendered inoperative until the bolt 4 is retracted to effect a closure of said circuit. The contact 17 has direct connection with one pole of the electric alarm or horn 19 of the automobile, so that when the bolt 4 has completed a full outward movement the circuit will be closed on the horn 19 to effect a continuous sounding of the same, and to such end the other pole of the horn 19 is connected directly to the opposite line of the source of electro-motive force, as illustrated in Fig. 3.

20 designates a push button or circuit closer arranged in the local circuit of the horn 19 and between the same and the connection of the rock arm 6 in said circuit, said push button or circuit closer 20 is employed by the operator in giving the usual road signals.

Having thus fully described my said invention what I claim as new and desire to secure by Letters Patent, is:—

A locking mechanism for automobiles comprising, an inclosing housing, a spring impelled locking bolt arranged in said housing and adapted for engagement in spaced peripheral notches in an automobile steering stem, said bolt having a lateral lug, a manually actuated dog adapted to engage and hold said bolt in a retracted position, a guard lock having an operating eccentric at its inner end, and an intermediate frame moving in parallel relation to said locking bolt and formed with a transversely elongated yoke opening at one end for engagement with the aforesaid operating eccentric, and a lateral lug at its other end for intermittent operative engagement with the lateral lug of the locking bolt, substantially as set forth.

Signed at Chicago, Illinois, this 22nd day of October, A. D. 1918.

CESARE CENTONI.